(12) United States Patent
Hirakata et al.

(10) Patent No.: US 6,288,595 B1
(45) Date of Patent: Sep. 11, 2001

(54) ON-DELAY-COMPENSATING ARM ON-DETECTION CIRCUIT

(75) Inventors: Masaki Hirakata; Satoki Takizawa; Seiki Igarashi, all of Tokyo (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 09/610,835

(22) Filed: Jul. 6, 2000

(30) Foreign Application Priority Data

Jul. 6, 1999 (JP) .................................................. 11-191528

(51) Int. Cl.[7] .................................................. H03K 17/56
(52) U.S. Cl. ............................................ 327/424; 327/588
(58) Field of Search ............................. 327/78, 423, 424, 327/588, 108, 111, 112, 478, 432, 433; 318/138, 254, 798, 806, 811

(56) References Cited

U.S. PATENT DOCUMENTS 4,597,037 * 6/1986 Okado ..................................... 363/41
4,772,996 * 9/1988 Hanei et al. ............................ 363/41
5,818,284 * 10/1998 Murakami et al. ................... 327/478

* cited by examiner

Primary Examiner—Toan Tran
Assistant Examiner—Cassandra Cox
(74) Attorney, Agent, or Firm—Rossi & Associates

(57) ABSTRACT

A circuit accurately detects an arm voltage pulse from an inverter that is used for on-delay compensation. Specifically, switching elements S1 to S6 are provided with detection circuits C1 to C6, respectively, for detecting an on or off state of a corresponding inverter arm in order to detect an arm voltage pulse from the inverter accurately and without delay. Since outputs from the detection circuits C1, C3, C5 on an upper arm have an excessively high voltage level before processing, level-down circuits Dw1, Dw3, Dw5 reduce these outputs down to an appropriate voltage level for signals used by a control circuit. The outputs are then provided to an on-delay compensator in the control circuit.

1 Claim, 7 Drawing Sheets

ON-DELAY-COMPENSATING ARM ON-DETECTION CIRCUIT

FIELD OF THE INVENTION

The present invention relates to an arm voltage pulse width detection circuit for an on5 delay compensation circuit (also referred to as a "dead time compensation circuit") for use in an inverter.

BACKGROUND

FIG. 4 shows an example of a conventional inverter circuit, wherein FIG. 4(a) shows a main circuit section, and FIG. 4(b) shows a control circuit section. In the inverter circuit in FIG. 4(a), switching elements S1 to S6 constituting an upper arm and a lower arm alternately repeat an operation in which an upper switching element is turned on while a corresponding lower switching element is turned off, thereby controlling an output voltage. During this switching operation of the pair of switching elements, however, an operational delay in the control circuit or the switching elements may turn both switching elements on, causing a power source to be short-circuited. To prevent this, a period when both switching elements are simultaneously turned off is inserted into the switching period to preclude such a short circuit. This period is called "on delay."

The insertion of on delay, however, may cause an error between the pulse width of the voltage to be output by the inverter and the pulse width of the voltage actually generated by the inverter, resulting in a decrease in output voltage or current distortion. Thus, methods are provided that compare a voltage command-value pulse width with the arm-voltage pulse width of the inverter to correct any error in the on/off ratio of the switching elements.

FIG. 5(a) is a time chart showing an on-delay compensation operation in the case where a phase current flows from an inverter to a motor. FIG. 5(b) is a time chart showing an on-delay compensation operation in the case where the phase current flows in the opposite direction, that is, from the motor to the inverter. In this case, a positive-potential side of a DC power source for an inverter main circuit is called a "P potential", and a negative-potential side thereof is called an "N potential". In FIG. 5(a), since the arm voltage generated during an on-delay period (DT) is the N potential, a voltage error relative to a PWM pulse command occurs during the on-delay period of the upper arm. An on-delay compensator carries out compensation by comparing a PWM pulse-command input pulse width with an inverter-arm voltage pulse width to extend the on period of the upper arm by an amount corresponding to the resulting error in inverter-arm voltage pulse width as shown by the arrow.

In FIG. 5(b), since the arm voltage generated during the on-delay period is the P potential, a voltage error relative to a PWM pulse command occurs during the on-delay period of the lower arm. An on-delay compensator carries out compensation as described above by comparing the PWM pulse-command input pulse width with the inverter-arm voltage pulse width to extend the on period of the lower arm by an amount corresponding to the resulting error in inverter-arm voltage pulse width as shown by the arrow.

The adoption of the above method requires the arm voltage pulse width of the inverter to be determined by a certain method. As shown in FIG. 4(a), conventional methods generally divide the arm voltage Vuarm of the inverter, for example, by means of resistors R10, R11, compare the resulting values by means of comp 12, and insulate the resulting output by means of a photo coupler PC1 before input to the on delay compensator in FIG. 4(b).

In the above pulse width detection circuit for inverter arm voltage based on the conventional method, however, voltage-dividing resistors having high resistance values are selected to reduce losses at the voltage-dividing resistance. Consequently, not only is the voltage prone to noise but the circuit also becomes equivalent to parallel connections of resistors and capacitors at high frequencies, thereby reducing detection accuracy. In addition, this circuit requires insulating elements such as photo couplers to insulate a control circuit from an inverter circuit, thereby inducing a detection delay.

Thus, when a circuit such as that in FIG. 4 is used for the on-delay compensation, the accuracy of comparison between the PWM pulse-command input pulse width and the inverter-arm voltage pulse width decreases, preventing compensation of voltage errors. As a result, the accuracy of compensation for an error in inverter-arm voltage pulse width arising from the on delay decreases, causing non-uniform rotations in the case of motor control. In addition, a circuit such as that in FIG. 4 requires a large number of external parts.

Therefore, the objects of the present invention are to reduce detection delay, to reduce the effects of noise, and to enable a detection circuit and a gate drive circuit to be integrated in order to reduce the number of external parts.

SUMMARY OF THE INVENTION

To attain these objects, according to the present invention, there is provided a detection circuit having arms each comprising a reverse parallel circuit including a semiconductor switching element and a free-wheel diode, the detection circuit detecting an on state of each of upper and lower arms of an inverter that converts a direct current into an alternating current, characterized in that: the semiconductor switching element on each of the upper and lower arms of the inverter is provided with a DC power source having its negative side connected to an emitter side of the semiconductor switching element, a first resistor connected to the positive side of the DC power source, a diode having an anode connected to the other terminal of the first resistor and a cathode connected to a collector of the semiconductor switching element, a reference potential having a negative side connected to the negative side of the DC power source, and a comparator to which the positive side of the reference potential and the potential of an anode-side terminal of the diode are input, in that each upper arm side is provided with a P channel FET having an output from the comparator connected to the gate thereof and the positive side of the DC power source connected to the source thereof to reduce the level of a comparator output signal, a second resistor connected between the drain of the FET and the emitter of the semiconductor switching element on the lower arm side, and a voltage detection section for detecting a terminal voltage of the second resistor, and in that an output from the voltage detection section and a comparator output from the lower arm side of the inverter are input to a compensation circuit as on-state detection signals for the upper and lower arms, respectively, with the compensation circuit operating to compensate for a voltage error between a command value and an actual value of a pulse width of an output voltage from the inverter, the error being caused by on delay.

Other advantages and features of the invention will become apparent from the following detailed description of the preferred embodiments of the invention and the accompanying drawings.

DETAILED DESCRIPTION OF THE PREFERRED EMBODIMENTS

Figure 1A:
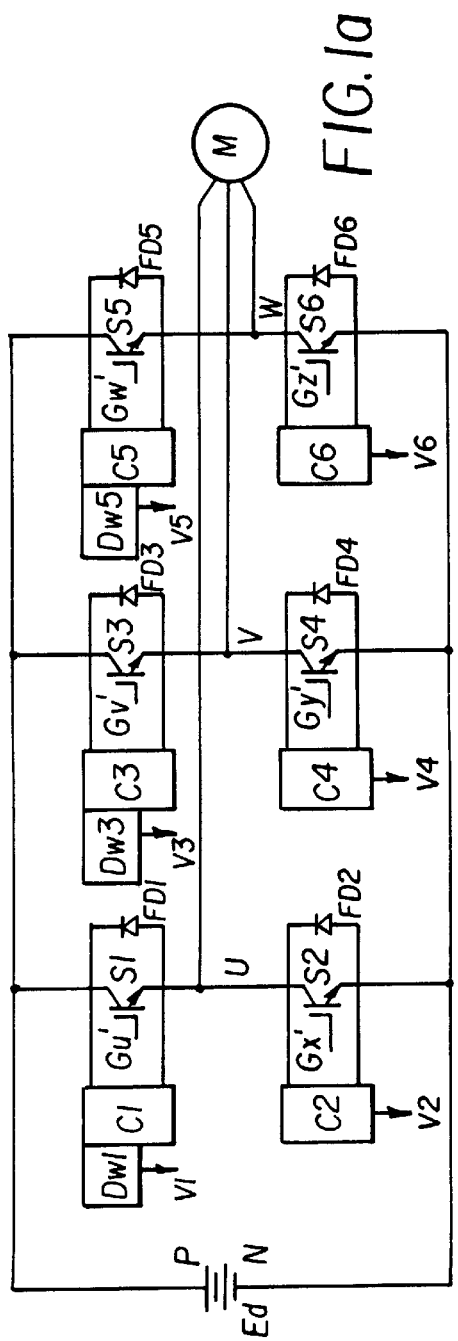
FIG. 1 is a block diagram showing an embodiment of the present invention.
Figure 1B:
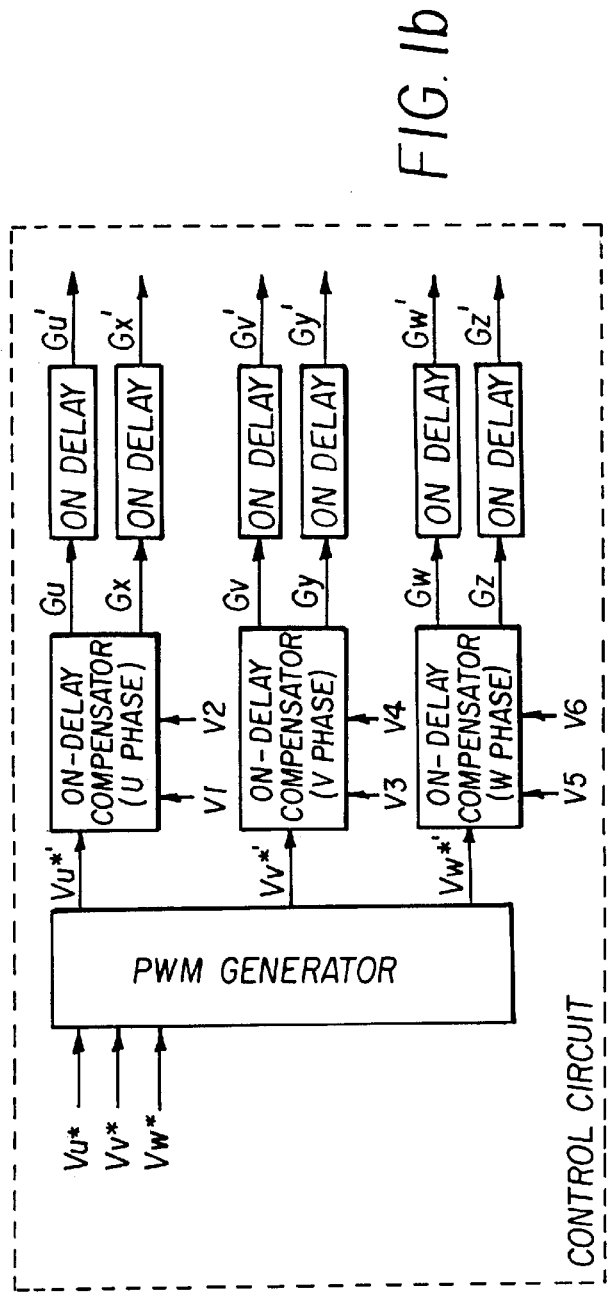

FIG. 1 is a block diagram showing an embodiment of the present invention. FIG. 1 (a) shows a main circuit section, and FIG. 1(b) shows a control circuit section. This circuit is comprised of inverter arm on-detection circuits C1 to C6 provided for semiconductor switching elements S1 to S6 on corresponding upper and lower arms forming an inverter main circuit, and level-down circuits Dw1, Dw3, Dw5 provided for the semiconductor switching elements S1, S3, S5 on the corresponding upper arms for reducing the level of outputs from the corresponding detection circuits. Thus, this circuit compares a PWM pulse generated by a PWM pulse generator with inverter-arm voltage pulses generated by the detection circuits C1 to C6 and level-down circuits Dw1, Dw3, Dw5 in order to compensate for an error in inverter-arm voltage pulse width originating in the on delay.

Figure 2:
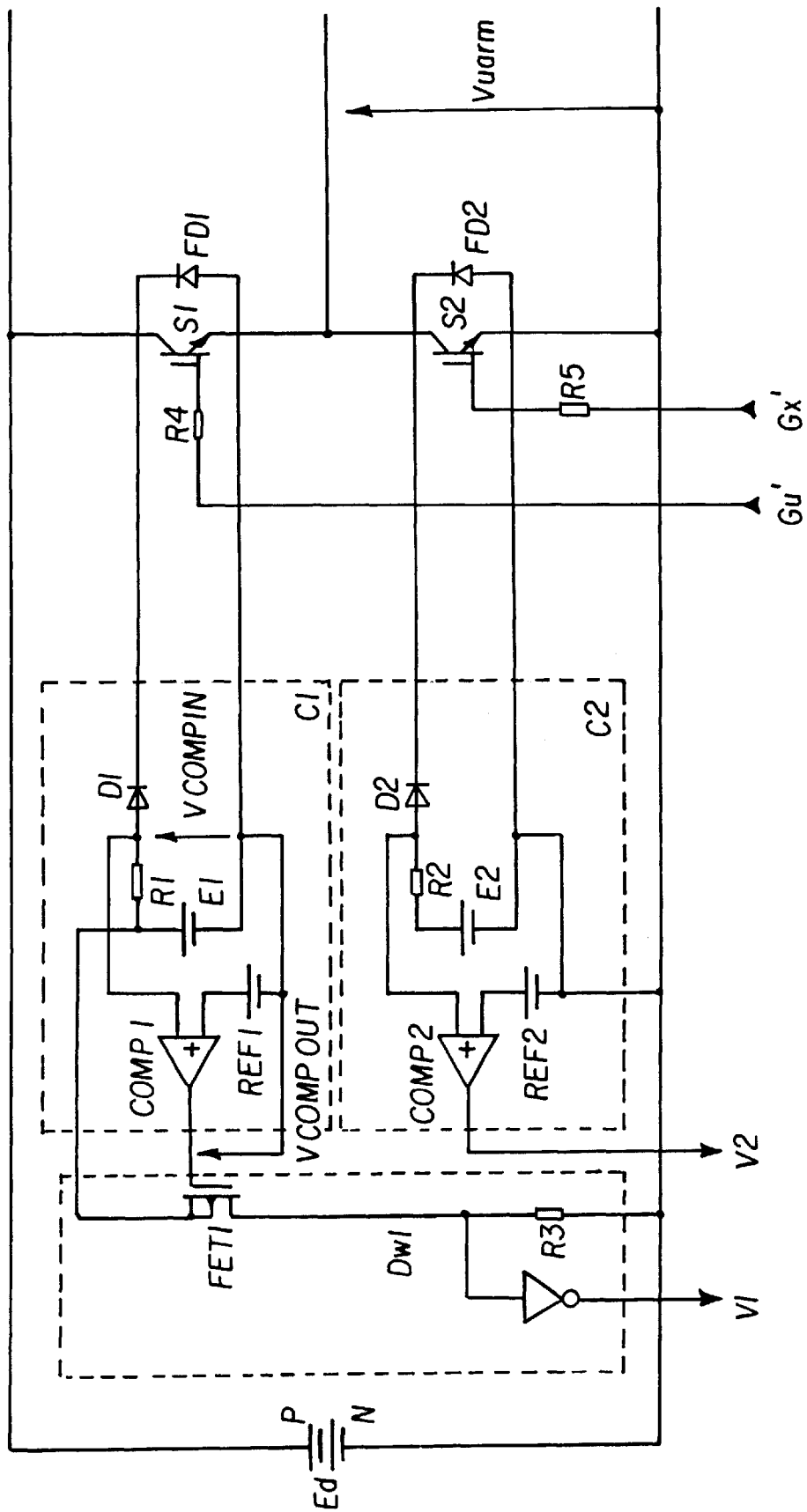
FIG. 2 is a partly detailed block diagram of FIG. 1.

The details of the detection circuits C1, C2 and the level-down circuit Dw1 will be described below. As shown in FIG. 2, the semiconductor switching element S1 is provided with the detection circuit C1 consisting of a DC power source E1 having its negative side connected to the emitter side of the semiconductor switching element S1, a resistor R1 connected to the positive side of the DC power source E1, a diode D1 having an anode connected to the other end of the resistor R1 and a cathode connected to the collector of the semiconductor switching element S1, a reference potential ref1 having its negative side connected to the negative side of the DC power source E1, and a comparator comp1 to which the positive side of the reference potential ref1 and a potential of an anode-side terminal of the diode D1 are input. The level-down circuit Dw1 consists of a P channel FET (Field Effect Transistor) having an output from the comparator connected to the gate thereof and the positive side of the DC power source E1 connected to the source thereof to reduce the level of a signal from the upper arm side, a resistor R3 connected between the drain of the FET and the emitter of the semiconductor switching element S1 on the lower arm side, and a voltage detection section for detecting a terminal voltage of the resistor R3. The detection circuit C2, which is similar to C1, is provided for the semiconductor switching element S2 on the lower arm side.

With this configuration, if the inverter arm voltage pulse has a P potential, the upper arm is turned on and the diode D1 of the arm on-detection circuit C1 provided on this arm becomes conductive to allow the comparator comp1 connected to the anode of the diode D1 to provide a high (Hi) output. This indicates that a pulse of the arm voltage of the inverter has a P potential. Then, based on this signal, FET1 of the level-down circuit Dw1 is operated in an active region to bear (consume) most of the P potential in order to detect the terminal voltage of the resistor R3 connected in series to FET1. Then, the ground potential of this signal is converted into an N potential, that is, a signal having the same potential as the ground potential of the control circuit, which is then provided to the a control circuit.

On the other hand, if the inverter-arm voltage pulse has an N potential, the lower arm is turned on and the diode D2 of the arm on-detection circuit C2 provided on this arm becomes conductive to allow the comparator comp2 connected to the anode of the diode D2 to provide a high (Hi) output. This indicates that a pulse of the arm voltage of the inverter has an N potential. The ground potential of this comparator output signal is the N potential, that is, the ground potential of the control circuit, and this signal is directly provided to the control circuit.

Figure 3:
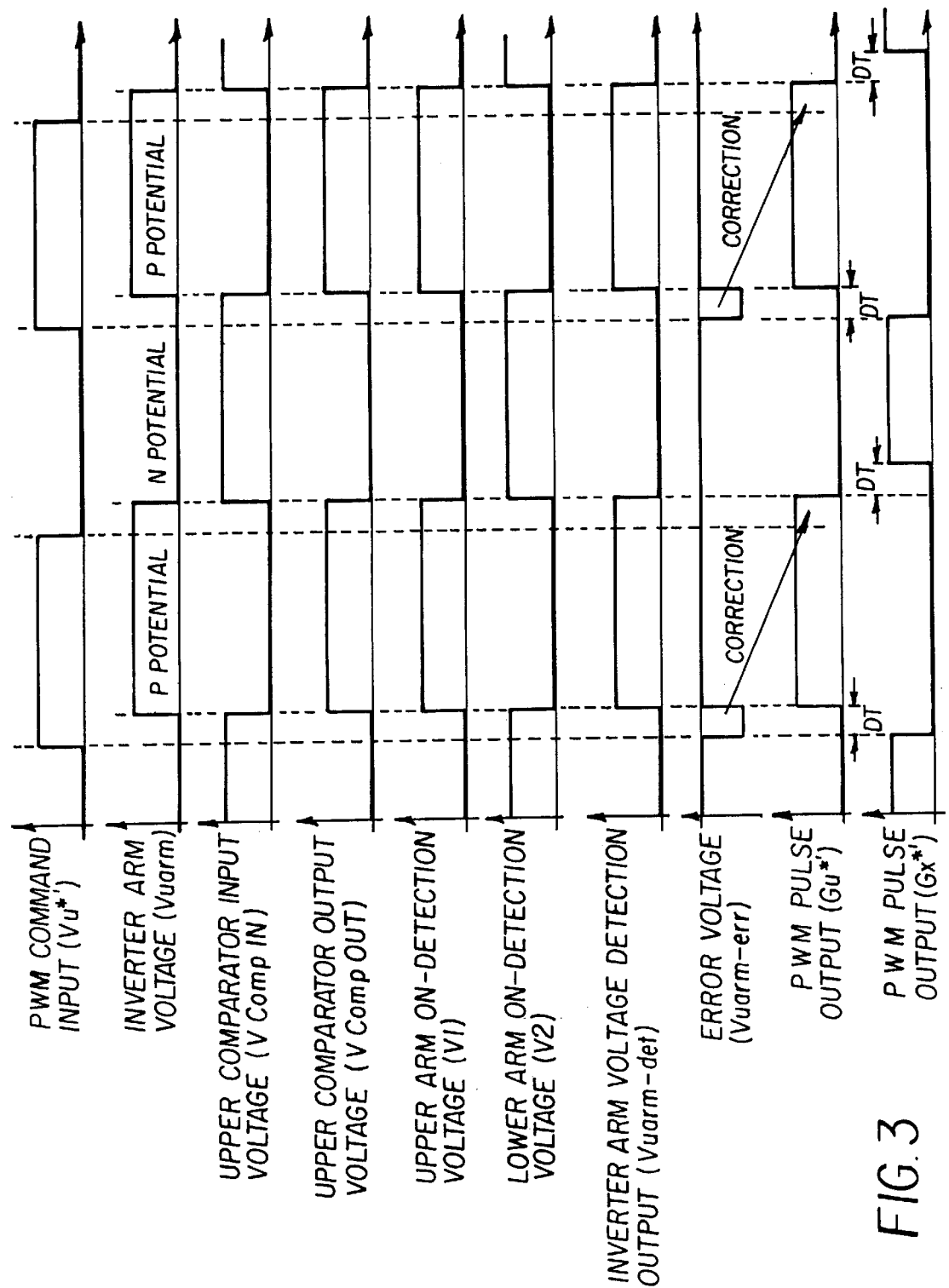
FIG. 3 is an explanatory drawing of operations in FIGS. 1 and 2.
Figure 4A:
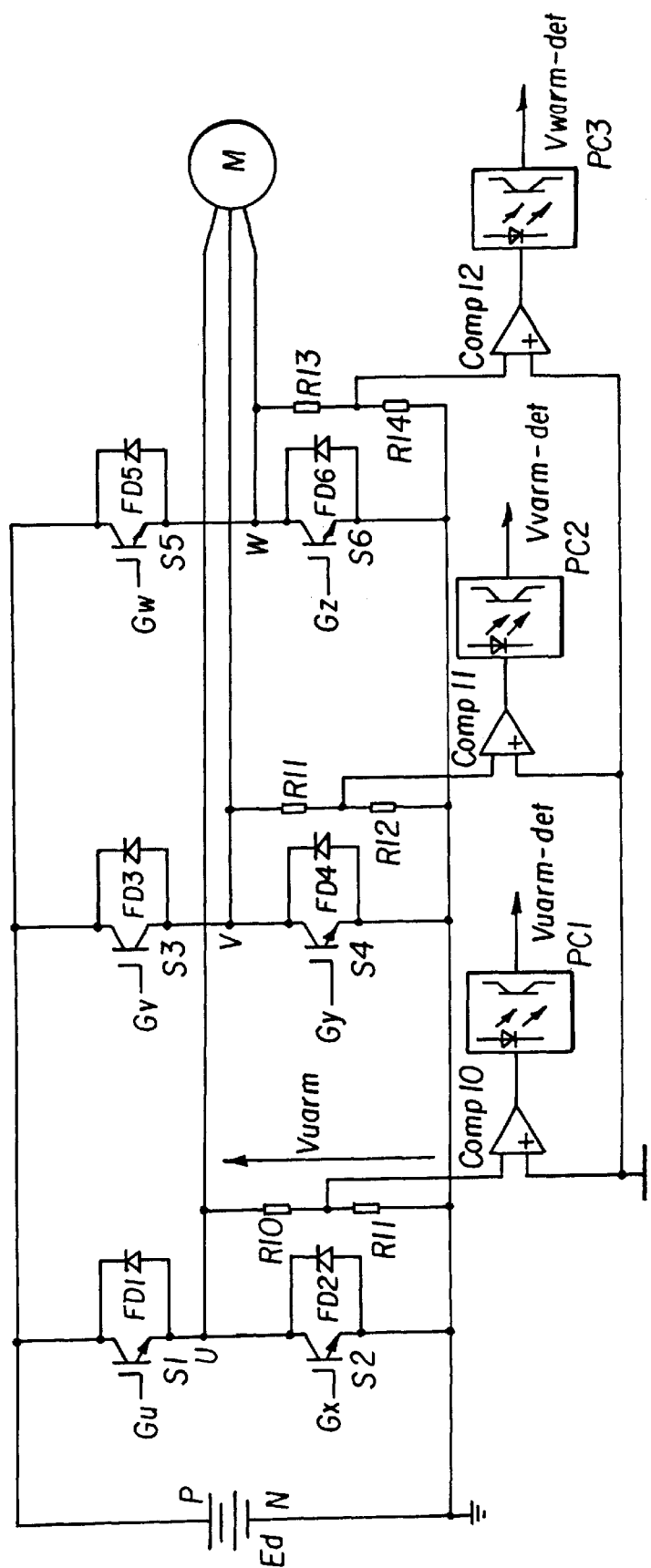
FIG. 4 is a block diagram showing a conventional example of a pulse width detection circuit for inverter arm voltage.
Figure 4B:
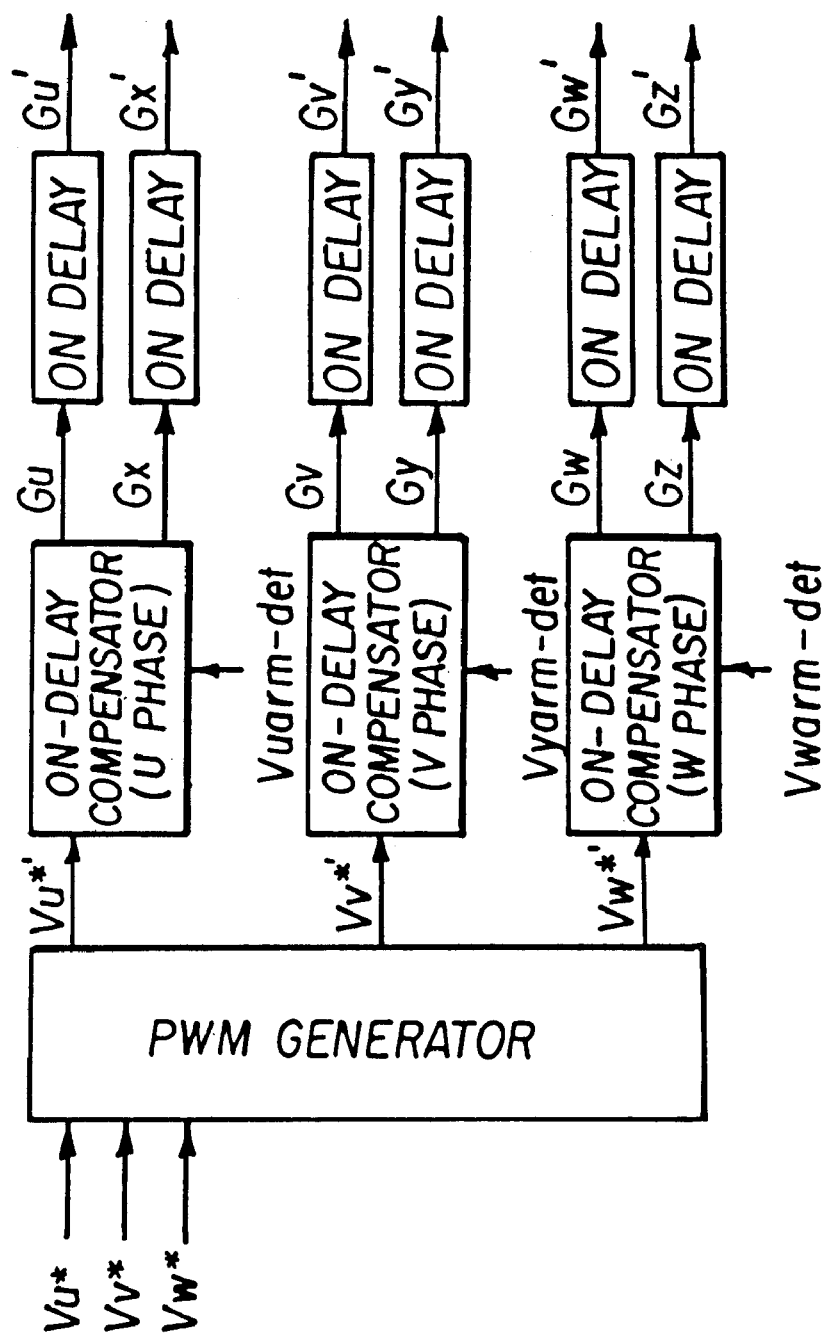
Figure 5A:
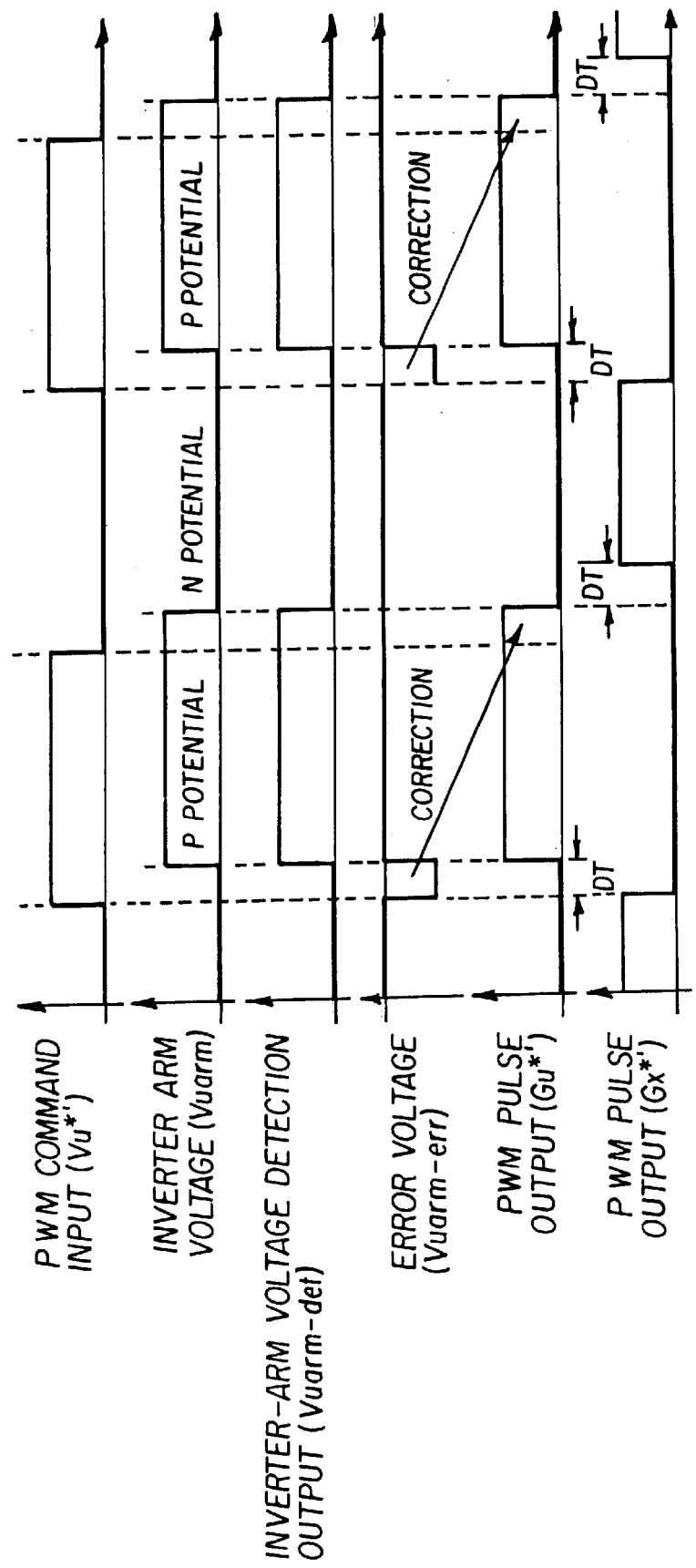
FIG. 5 is an explanatory drawing of an operation in FIG. 4.
Figure 5B:
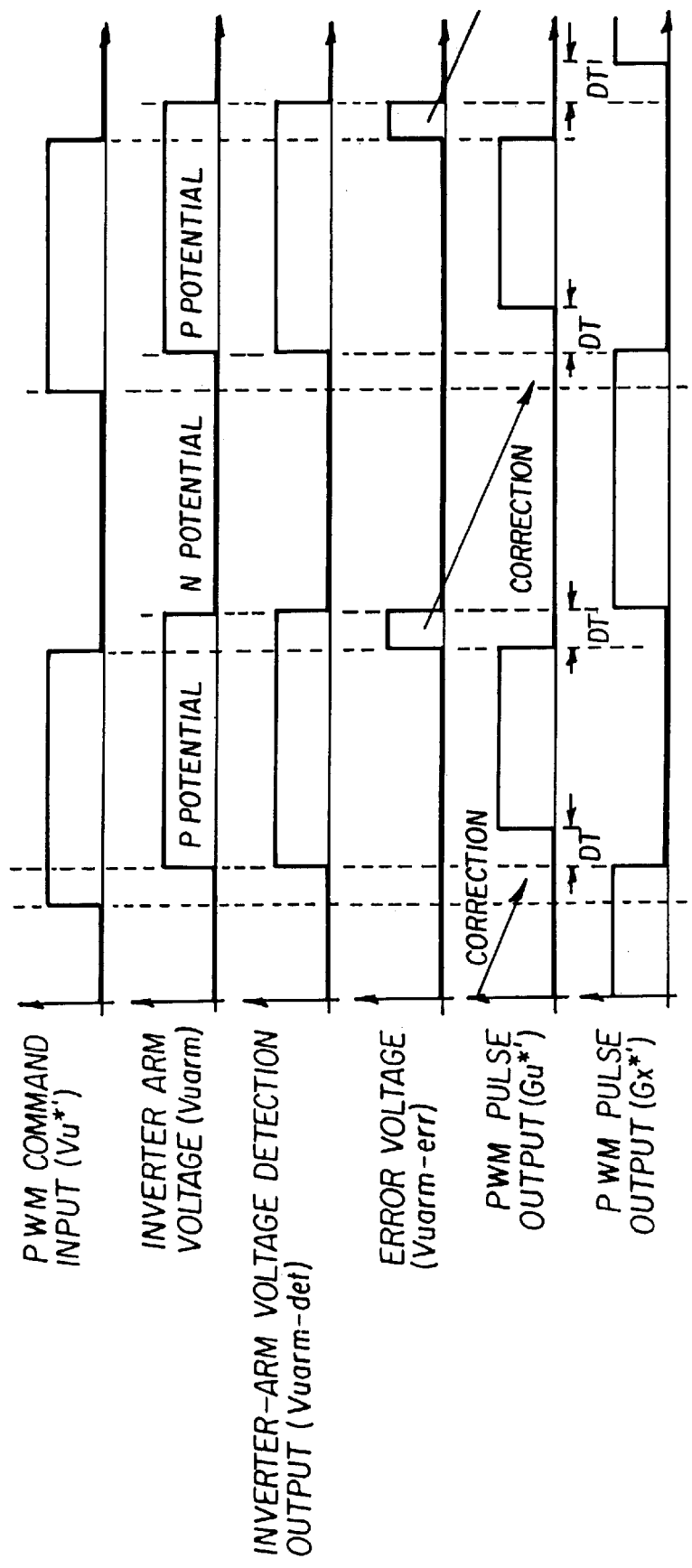

FIG. 3 shows waveforms of operations of the circuits shown in FIGS. 1 and 2. This figure also shows an example of the case where a phase current flows from the inverter to a motor and is characterized in that an output from the level-down circuit is used as an on-state detection signal for the upper arm V1 while a comparator output from the detection circuit on the lower arm side is used as an on-state detection signal for the lower arm V2. The other on-delay compensation principles are similar to those in the prior art and are thus omitted.

Vu* denotes a PWM command input, Vuarm is an inverter U-phase arm voltage, VcompIN denotes an input voltage to the comparator comp1, VcompOUT denotes an output voltage from the comparator comp1, V1 denotes an upper-arm on-detection voltage, V2 denotes a lower-arm on-detection voltage, Vuarm-det denotes an inverter U-phase arm voltage detection output, Vuarm-err denotes an error voltage, and Gu*' and Gx*' denote PWM pulse outputs.

According to the present invention, in detecting a voltage pulse from the inverter arm used for the compensation circuit for on delay added to a switching pattern for the inverter, the on and off states of the diode linked with the on and off states of the inverter arm are detected. Therefore, not only is there an increase in noise tolerance and improvement of detection accuracy expected, but the need to insulate the upper and lower arms from each other for voltage pulse detection and the need for voltage-dividing resistors are eliminated, thereby enabling integration. As a result, a decrease in the number of parts, space-saving, and cost reduction can be realized to obtain an inexpensive high-performance circuit.

The invention has been described with reference to certain preferred embodiments thereof. It will be understood, however, that modifications and variations are possible within the scope of the appended claims.

What is claimed is:

1. An on-delay-compensating arm on-detection circuit having arms each comprising a reverse parallel circuit including a semiconductor switching element and a free-wheel diode, the detection circuit detecting an on state of each of upper and lower arms of an inverter that converts a direct current into an alternating current, characterized in that the semiconductor switching element on each of the upper and lower arms of said inverter is provided with a DC power source having its negative side connected to the emitter side of said semiconductor switching element, a first resistor connected to the positive side of the DC power source, a diode having an anode connected to the other terminal of the first resistor and a cathode connected to the collector of said semiconductor switching element, a reference potential having its negative side connected to the negative side of said DC power source, and a comparator to which a positive side of the reference potential and a potential of an anode-side terminal of said diode are input, in that each upper arm side is provided with a P channel FET having an output from said comparator connected to the gate thereof and the positive side of said DC power source connected to the source thereof to reduce the level of a comparator output signal, a second resistor connected between the drain of the FET and the emitter of said semiconductor switching element on the lower arm side, and a voltage detection section for detecting a terminal voltage of the second resistor, and in that an output from the voltage detection section and a comparator output from the lower arm side of said inverter are input to a compensation circuit as on-state detection signals for the upper and lower arms, respectively, with the compensation circuit operating to compensate for a voltage error between a command value and an actual value of a pulse width of an output voltage from the inverter, the error being caused by on delay.

* * * * *